(12) United States Patent
Khairmode et al.

(10) Patent No.: US 12,313,773 B2
(45) Date of Patent: May 27, 2025

(54) RADAR SIGNAL BASED MACHINE LEARNING

(71) Applicant: ATAI LABS PVT LTD., Hyderabad (IN)

(72) Inventors: Vijay Shankar Khairmode, Hyderabad (IN); Aanandh Suttamalli Balasubramanian, Hyderbad (IN); Vidya Manoher Bommena, Hyderabad (IN); Gangadhar Gude, Rangareddy (IN); Kishor Bulli Arumilli, Hyderabad (IN)

(73) Assignee: ATAI LABS PVT LTD., Hyderabad (IN)

( * ) Notice: Subject to any disclaimer, the term of this patent is extended or adjusted under 35 U.S.C. 154(b) by 497 days.

(21) Appl. No.: 17/418,748

(22) PCT Filed: Dec. 31, 2019

(86) PCT No.: PCT/IN2019/050968
§ 371 (c)(1),
(2) Date: Jun. 25, 2021

(87) PCT Pub. No.: WO2020/141548
PCT Pub. Date: Jul. 9, 2020

(65) Prior Publication Data
US 2022/0057487 A1    Feb. 24, 2022

(30) Foreign Application Priority Data
Dec. 31, 2018  (IN) .............................. 201841050104

(51) Int. Cl.
*G01S 7/41*    (2006.01)
*G01S 13/931*  (2020.01)

(52) U.S. Cl.
CPC ............ *G01S 7/417* (2013.01); *G01S 13/931* (2013.01)

(58) Field of Classification Search
CPC ......... G01S 7/417; G01S 13/931; G01S 7/354
See application file for complete search history.

(56) References Cited

U.S. PATENT DOCUMENTS

| | | | |
|---|---|---|---|
| 8,977,489 B2 | 3/2015 | Szczerba et al. | |
| 2003/0151541 A1* | 8/2003 | Oswald | ............ B60R 21/01538 342/72 |

(Continued)

FOREIGN PATENT DOCUMENTS

| | | | | |
|---|---|---|---|---|
| EP | 3417311 B1 * | 8/2019 | ............. | G01S 13/53 |

OTHER PUBLICATIONS

International Search Report and Written Opinion received for PCT Patent Application No. PCT/IN2019/050968, mailed on Apr. 28, 2020, 8 pages.

*Primary Examiner* — Timothy A Brainard
*Assistant Examiner* — Kenneth W Good
(74) *Attorney, Agent, or Firm* — Workman Nydegger (57) ABSTRACT

Techniques of object classification are described. In operation, a radar signal reflected by an object within range of the radar detection system is received and at least one set of frequency components corresponding to the object are extracted. At least one set of unit energy samples corresponding to the object is then generated based on the at least one set of frequency components followed by computation of a range compensated energy (RCE) corresponding to the object based on the at least one set of frequency components, where the RCE is indicative of range normalized energy corresponding to the object. A feature vector corresponding to the object is then generated based at least on the at least one set of unit energy samples and the RCE, wherein the (Continued)

feature vector is representative of characteristics of the object.

18 Claims, 4 Drawing Sheets

(56) References Cited

U.S. PATENT DOCUMENTS

| | | | |
|---|---|---|---|
| 2009/0149770 A1* | 6/2009 | Sing | A61B 5/18 600/544 |
| 2016/0061935 A1 | 3/2016 | McCloskey et al. | |
| 2020/0041612 A1* | 2/2020 | Harrison | G01S 7/40 |
| 2020/0142048 A1* | 5/2020 | Shayovitz | G01S 7/023 |

* cited by examiner

RADAR SIGNAL BASED MACHINE LEARNING

CROSS-REFERENCE TO RELATED APPLICATIONS

This application claims priority to PCT Application No. PCT/IN2019/050968 filed Dec. 31, 2019, entitled "RADAR SIGNAL BASED MACHINE LEARNING", which claims the benefit of and priority to Indian Application No. 201841050104, filed Dec. 31, 2018. Each of the aforementioned applications are incorporated by reference herein in their entirety.

TECHNICAL FIELD

The present subject matter relates, in general, radar detection systems, and in particular, to classification of objects in radar detection systems.

BACKGROUND

Object recognition or classification is used in a wide variety of fields, such as autonomous vehicles, Advanced Driving Assistance System (ADAS) applications like forward collision warning, robotics, drone etc., where obstacle or object detection and identification is required. The proper identification of an object may be vital for correct decision making such as taking evasive action to avoid object collision, braking, overtaking, etc.

BRIEF DESCRIPTION OF THE DRAWINGS

The detailed description is described with reference to the accompanying figures. In the figures, the left-most digit of a reference number identifies the figure in which the reference number first appears. The same numbers are used throughout the figures to reference the same elements.

DETAILED DESCRIPTION

The present subject matter generally relates to radar detection systems and specifically to classification of objects by a radar detection system.

Several applications nowadays are driven by artificial intelligence where decision making is dependent on determination of objects and their classification into one or more groups. For example, vehicles utilize radar systems to detect and classify other vehicles, pedestrians, or other objects on a road on which the vehicle is travelling. Many techniques utilize camera based object classification to determine and classify different objects. However, camera based object classification is limited in their operation due to environmental conditions like rain, fog, etc.

Therefore, radar based object classification techniques are generally preferred for reliable operation in all conditions. While radar based detection systems are generally useful, they do not provide reliable object classification, to be used in areas, such as autonomous vehicles and robotics.

Accordingly, techniques of improved object classification based on radar detection systems are described. In an example implementation of the present subject matter, radar detection systems utilize frequency modulated continuous wave (FMCW) signals for object detection. FMCW radar signals may be transmitted by the radar and the radar signals reflected by an object are received by a signal receiving unit of the radar detection system. It would be noted that a radar signal may be reflected by an object through its various surfaces depending upon the various properties of the surface of the object, like area, paint, reflectivity, polish, etc.

In an example implementation of the present subject matter, the radar detection system may include multiple antennas to receive the radar signal reflected by the object. Further, in conditions of multiple objects in the vicinity of the radar detection system, multiple reflected radar signals may be received by each of the antenna of the radar detection system. For the ease of explanation, the implementation of the present subject matter and the techniques of object classification are described in reference to one object, reflecting radar signals, and one antenna of the radar detection system receiving such radar signals, reflected by the object.

In an example implementation of the present subject matter, the received radar signal is analyzed to determine its characteristics and accordingly identify the class of the object reflecting the radar signal. It would be noted that the properties of the radar signal reflected by an object may depend on various factors, like the distance of the object from the signal receiving unit, angle of the object with respect to antenna of the radar detection system, reflectivity and structure of the object surface exposed to the transmitted radar signals, and area of the reflected surface, etc.

To classify the object correctly, the properties of the received radar signal which correspond to the object are determined, while discarding other characteristics of the radar signal that are not dependent on the properties of the object, such as distance of the object from the antenna of the radar detection system and object's azimuth and elevation angle with respect to the antenna of the radar detection system.

To this end, at least one set of frequency components within the received radar signal is determined corresponding to the object. The number of frequency components within each set of frequency components are either static, or dynamically determined based on the operating conditions of the radar detection system.

In an example, each set of frequency components may correspond to a particular property of the object. For instance, one set of frequency components may include frequency components corresponding to range of the object's reflecting surfaces or parts, while other set of frequency components may include frequency components corresponding to azimuth angles of the object's reflecting surfaces or parts. Similarly, another set of frequency components may correspond to elevation angles of the object's reflecting surfaces or parts.

In an example of the present subject matter, the amplitude of the each of the frequency components is proportional to the energy reflected by the surface of the object corresponding to that frequency component. For the FMCW radar signals, frequency components are beat frequency components in receive chain of the radar and the beat frequency signal maybe generated by mixing the transmitted FMCW signal with the received reflected radar signal.

For the ease of reference, the set of frequency components corresponding to the range of the object have been referred to as range frequency components, while the frequency components corresponding to azimuth angle of the object have been referred to as azimuthal frequency components, and the set of frequency components corresponding to the elevation angle of the object have been referred to as elevation frequency components, hereinafter. It would be noted that the set of frequency components may represent the distribution of reflected energy in a given dimension. For example, the range frequency components represent the distribution of reflected energy in range dimension.

Further, at least one set of unit energy samples corresponding to the object based on each of the at least one set of frequency components is computed. In an example of the present subject matter, the set of unit energy samples is representative of a unit energy corresponding to each of the at least one set of frequency components extracted for the object. For example, a set of unit energy samples correspond to the range frequency components and other set of unit energy samples may correspond to the set of azimuthal frequency components. In other words, the unit energy samples are computed such that total energy of the unit energy samples is one unit and the interrelation between the frequency components of the signal remains same.

Further, a range compensated energy (RCE) corresponding to the object based on the set of frequency components is computed where the RCE is indicative of range normalized energy corresponding to the object.

In an example of the present subject matter, a feature vector is generated corresponding to the object, based at least on the at least one set of unit energy samples and the RCE.

It would be understood that the computation of the at least one set of unit energy samples and the RCE allows normalization of the properties of the received radar signal, such that the at least one set of unit energy samples represent a signal with one-unit energy and the RCE is indicative of energy of the object at one-unit distance. Hence, the feature vector thus generated includes true characteristics of the object, while discarding the properties not related to the object, such as distance of the object from the antenna of the radar detection system and object's angle with respect to the antenna of the radar detection system.

In an example of the present subject matter, the feature vector may also include features corresponding to other characteristics of the object determined based on one of doppler effect, micro-doppler effect, and velocity. In an example of the present subject matter, the feature vector is utilized to classify the object. In another example, the feature vector is utilized to train the radar detection system for classification of objects based on feature vectors.

The above techniques are further described in conjunction with the following figures. It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope.

Furthermore, all examples recited herein are principally intended expressly to be only for illustrative purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" is used throughout for clarity of the description and can include either a direct connection or an indirect connection.

It should also be noted that the description and the figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

Figure 1:
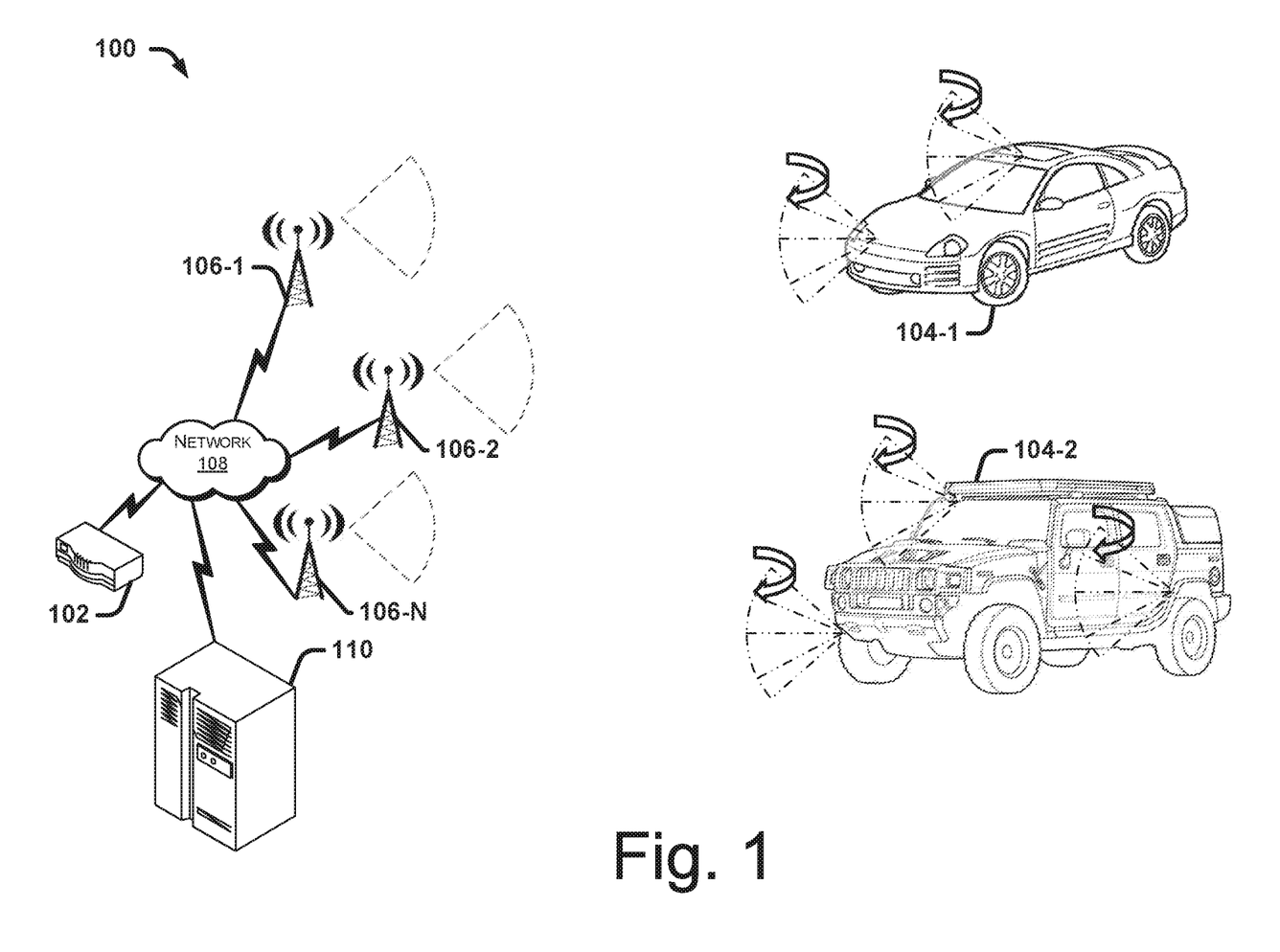
FIG. 1 illustrates a navigation environment, implementing a radar detection system, in accordance with an example implementation of the present subject matter.

FIG. 1 illustrates a navigating environment 100 implementing a radar detection system 102. The radar detection system 102 is to classify different objects, such as 104-1 and 104-2. In an example of the present subject matter, the radar detection system 102 is connected to one or more radar antennas 106-1, 106-2, 106-N, through a communication network 108.

In an example of the present subject matter, the radar detection system 102 may be implemented in any navigational environment, connected to one or more systems through variety of network devices, including routers, bridges, servers, computing devices, storage devices, etc. For example, the radar detection system 102 may be implemented in a vehicle for detection and classification of objects on a road. In another example, the radar detection system 102 may be implemented in a robotic device to determine obstacles and classify objects. Therefore, the radar detection system 102 may be implemented in various environments, depending upon the operating conditions and requirement of object classification.

The radar detection system 102 can be implemented as and in a variety of computing devices. For example, the radar detection system 102 may be implemented as/ in a laptop computer, a desktop computer, a notebook, a workstation, a mainframe computer, a mobile device, a personal digital assistant (PDA), a tablet, and the like.

It would be noted that the objects 104-1 and 104-2 may include different items, depending upon the implementation of the radar detection system 102. For example, the objects 104-1 and 104-2 may include cars, trucks, humans, animals, lamp posts, when the radar detection system 102 is implemented in a vehicle. Similarly, the objects 104-1 and 104-2 may include boxes, work stations and assembly lines, if the radar detection system 102 is implemented in a Robotic device of an automated industry line. The objects 104-1 and 104-2 have been commonly referred to as objects 104, hereafter.

In an example of the present subject matter, the one or more radar antennas 106-1, 106-2, 106-N may be coupled to the radar detection system 102 through the network 108. The one or more radar antennas 106-1, 106-2, 106-N may be placed at different locations and at different elevation angles to transmit and receive radar signals in the vicinity. It would be noted that the one or more radar antennas 106-1, 106-2, 106-N may either be portable, or may also be fixed, depending upon the implementation of the radar detection system 102. For the ease of explanation, the one or more radar antennas 106-1, 106-2, 106-N have been commonly referred to as radar antennas 106.

In an example of the present subject matter, the antennas 106 are coupled to the radar detection system 102 through wired or on-chip connections, and are mounted on an object, such as a vehicle. In such implementations, the antennas 106 may be small in size and may be mounted on any part of the object. For example, the antennas 106 may be of the size of about 10 cm and 5 cm, such as that of a credit card, and may be pasted on the bumper of a vehicle. In another example, the antennas 106 may be mounted on the roof of the vehicle. It would be appreciated that the antennas 106 may be implemented in different shapes and sizes and may either be portable, or may be pre-installed at predefined locations.

In an example of the present subject matter, the network 108 may be a wireless or a wired network, or a combination thereof. The network 108 can be a collection of individual networks, interconnected with each other and functioning as a single large network (e.g., the internet or an intranet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the network 108 includes various network entities, such as gateways, routers, switches, cables, etc.; however, such details have been omitted for ease of understanding.

In another example implementation of the present subject matter, the radar detection system 102 may be coupled to a server 110, through the network 108. The server 110 may either store data for utilization by the radar detection system 102, for classification of objects, and/ or may provide substitute computational capability to the radar detection system 102. The server 110 may be implemented either as a portable computing system, or may be located at a defined geographic location.

In an example of the present subject matter, the radar detection system 102, may transmit radar signals through the antennas 106. The radar signal reflected by the objects may then be received by the antennas 106 and processed by the radar detection system 102, according to the techniques of the present subject matter, to classify the objects into one or more groups.

It would be understood that the radar detection system 102 may implement any known form of operation, such as bistatic radar, mono-static radar, continuous wave radar, frequency modulated continuous wave radar, pulse, radar, doppler radar, mono pulse radar, passive radar, planar array radar, pulse doppler radar, stepped frequency radar, synthetic aperture radar, over the horizon radar, PMCW radar, CDMA radar, OFDMA radar, and the like.

For the ease of understanding, the functionality of the radar detection system 102 has been further described in detail with respect to the description of the forthcoming figures.

Figure 2:
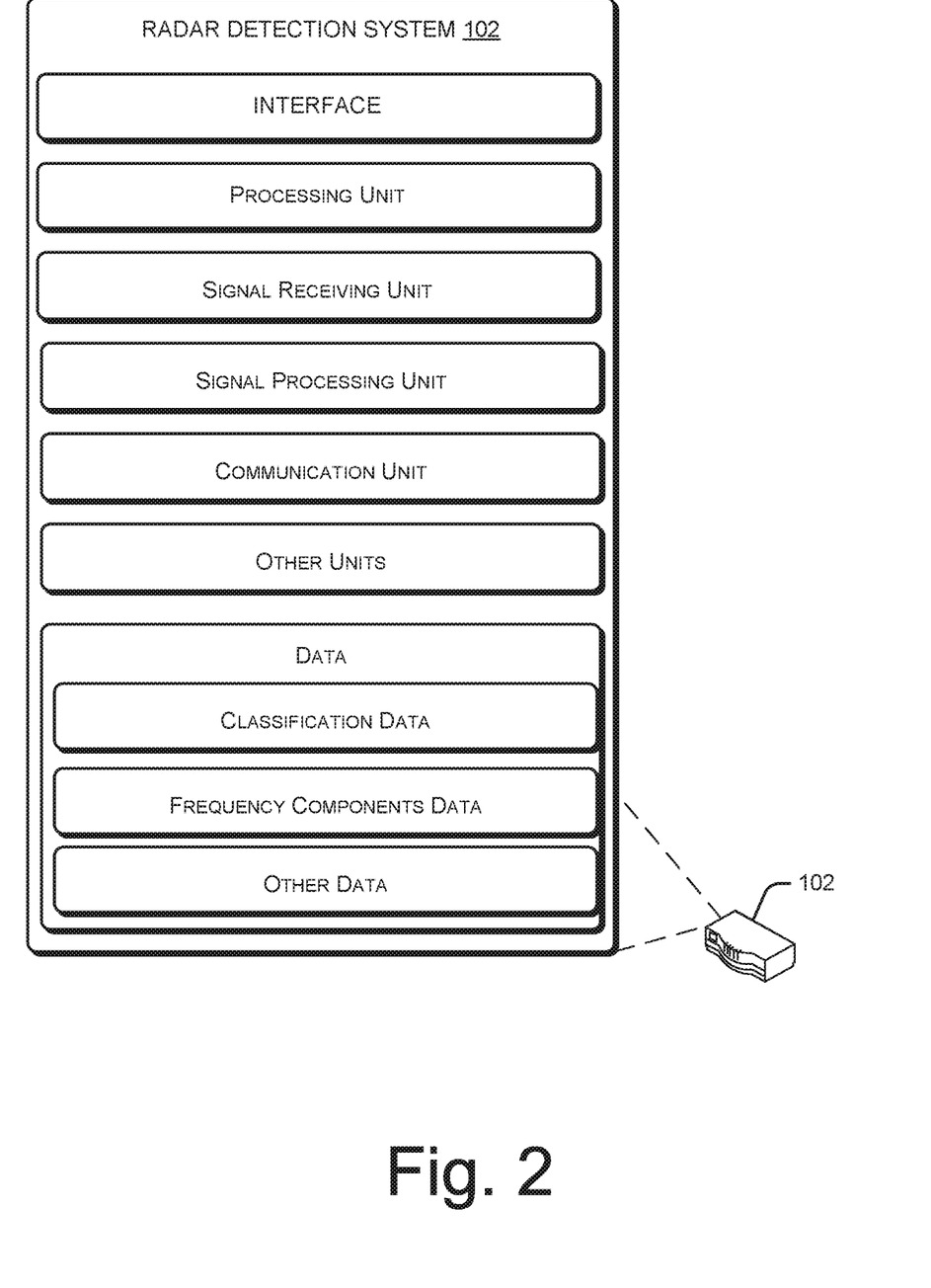
FIG. 2 illustrates a schematic representation of various components of a radar detection system, in accordance with an example implementation of the present subject matter.

FIG. 2 illustrates a schematic representation of various components of a radar detection system, in accordance with an example implementation of the present subject matter. In an example of the present subject matter, the radar detection system 102 includes one or more processor(s), interface(s), and different units for receiving and processing signals and data.

The processors of the radar detection system 102 can be a single processing unit or a number of units, all of which could also include multiple computing units. The processors may be implemented as one or more microprocessors, microcomputers, microcontrollers, digital signal processors, central processing units, state machines, logic circuitries, and/or any devices that manipulate signals based on operational instructions. Among other capabilities, each of the processors is configured to fetch and execute computer-readable instructions and data stored in memory of the radar detection system 102.

Functions of the various elements shown in the figures, including any functional blocks labeled as "processor(s)", may be provided through the use of dedicated hardware as well as hardware capable of executing software in association with appropriate firmware. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing instructions, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

Each of the interfaces may include a variety of instructions and hardware interfaces, for example, interface for peripheral device(s), such as connections for the antennas 106, connections for external memory, etc. Further, the interfaces may enable the radar detection system 102 to communicate with other network entities, such as antennas 106 and the server 110. Example of interfaces that can be used in the proposed system may include Controller Area Network (CAN), Local Interconnect Network (LIN), Flexray, Ethernet, Mobile Industry Processor Interface (MIPI), High-Definition Multimedia Interface (HDMI), Universal Serial Bus (USB), Serial Peripheral Interface (SPI), Inter-Integrated Circuit (I2C), universal asynchronous receiver-transmitter (UART), chip to chip connectivity, board to board connectivity, networking protocols.

In an example implementation of the present subject matter, the radar detection system 102 may include a signal receiving unit, a signal processing unit, a communication unit along with other units for implementing the techniques of the present subject matter. Different units within the radar detection system 102 may either be implemented in hardware, instructions executed by a processing unit, or by a combination thereof. The unit(s) can comprise a computer, a processor, a state machine, a logic array or any other suitable devices capable of processing instructions. Also, each unit may be a general-purpose processor which executes instructions to cause the general-purpose processor to perform the required tasks or, the unit can be dedicated to perform required functions.

Further, the radar detection system 102 may also include data stored in a memory. The data may include various data required by the radar detection system 102 such as classification data, frequency data and other data. The memory to store the data may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. As described earlier, the data may either be stored on the radar detection system 102, or may be accessed by the radar detection system 102, through the network 108. For example, the radar detection system 102 may communicate with the server 110 to obtain the data, whenever required.

In operation, the radar detection system 102 may transmit radar signals through the communication unit, via the antennas 106. In an example of the present subject matter, the radar signals may include FMCW signals transmitted through the antennas 106. In an example, the signal receiving unit may receive a radar signal reflected by an object within range of the radar detection system 102. It would be noted that a radar signal may be reflected by an object through its various surfaces depending upon the various properties of the surface of the object, like area, paint, reflectivity, polish, etc.

As described in FIG. 1, the radar detection system 102 may be connected to one or more antennas 106 to receive the radar signal reflected by the object. Further, in conditions of multiple objects in the vicinity of the radar detection system, multiple reflected radar signals may be received by each of the antenna 106 of the radar detection system 102. For the ease of explanation, the implementation of the radar detection system 102 and the techniques of object classification are described in reference to one object, reflecting radar signals, and one antenna 106 of the radar detection system 102 receiving such radar signals, reflected by the object.

In an example of the present subject matter the signal processing unit may process the received radar signals. The signal processing unit may extract at least one set of frequency components corresponding to the object from the radar signal and the number of frequency components included in each of the at least one set of frequency components are based at least on at least one of configuration, operating condition, and operating environment of the radar detection system.

In an example, each set of frequency components may correspond to a particular property of the object. For instance, one set of frequency components may include frequency components corresponding to range of ranges of the object's reflecting surfaces or parts, while other set of frequency components may include frequency components corresponding to azimuth angles of the object's reflecting surfaces or parts. Similarly, another set of frequency components may correspond to elevation angles of the object's reflecting surfaces or parts. The amplitude of the each of the frequency components is proportional to the energy reflected by the surface of the object corresponding to that frequency component.

As described earlier, the set of frequency components corresponding to the range of the object have been referred to as range frequency components, the frequency components corresponding to azimuth angle of the object have been referred to as azimuthal frequency components, and the set of frequency components corresponding to the elevation angle of the object have been referred to as elevation frequency components.

In an example implementation of the present subject matter, the signal processing unit also determines a peak beat frequency corresponding to the object, within each set of the frequency components. It would be noted that the peak beat frequency is indicative of range of the object from the antennas 106 connected to the radar detection system 102. In an example, the peak beat frequency within each set of frequency components may be determined based on comparison of amplitude of frequency components within the radar signal with a predetermined threshold amplitude value.

It would be appreciated that the for FMCW radar signals, frequency components are beat frequency components in receive chain of the radar. Further, the beat frequencies are generated by mixing the transmitted FMCW signal with the reflected radar signal.

Figure 3:
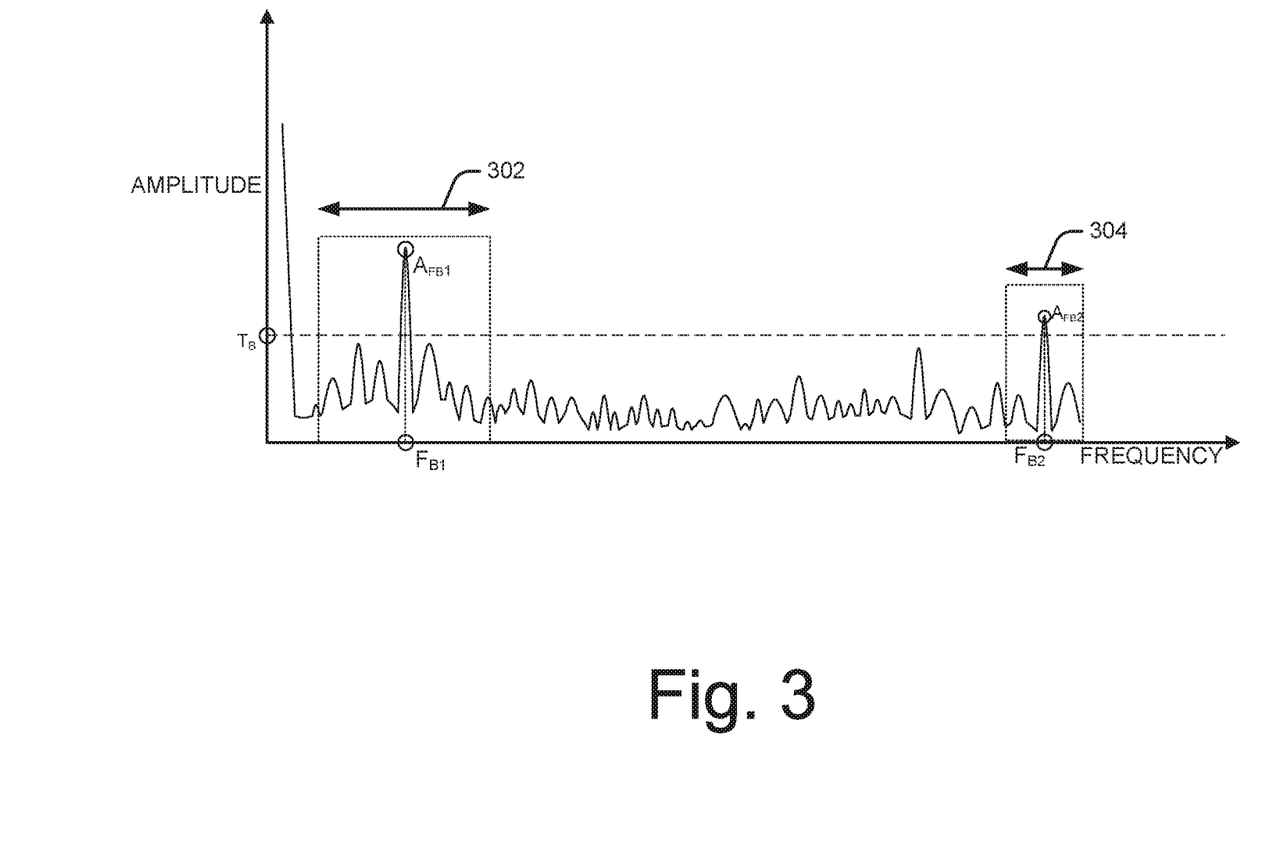
FIG. 3 illustrates a frequency domain graph depicting various frequencies received by the radar detection system, in accordance with an example implementation of the present subject matter.

An example of a reflected radar signal, as received by the signal processing unit has been described in reference to FIG. 3. FIG. 3 represents a frequency vs. amplitude graph of a radar signal, as received by the signal receiving unit of the radar detection system 102.

As depicted in the beat frequency signal received by the signal receiving unit, different frequencies may have different amplitude and accordingly, the signal may include different peaks and dips at different frequencies. In an example, the signal processing unit may determine the frequencies within the range 302 as a set of range frequency components. The number of frequency components to be included within the range 302 may either be determined statistically, or dynamically, by the signal processing unit. Further, the signal processing unit may also determine $F_{B1}$ as the peak beat frequency within the set of range frequency components. The peak beat frequency may either be identified by determining the frequency having the highest amplitude within the range of frequencies 302, or by identifying the frequency with amplitude above a pre-defined threshold, such as threshold $T_B$.

It would be noted that the signal processing unit may also determine other set of frequency components corresponding to other objects in the vicinity of the radar detection system 102. For example, another set of frequency components in a range 304 may be determined by the signal processing unit, corresponding to another object in the vicinity of the radar detection system 102. Further, the signal processing unit may determine a peak beat frequency $F_{B2}$ for this set of frequency components corresponding to the other object.

Thus, the signal processing unit may determine one or more set of frequency components from the received radar signal, corresponding to each object and also determine peak beat frequency within each set of frequency components.

In an example of the present subject matter, the signal processing unit may also generate at least one set of unit energy samples corresponding to the object based on the at least one set of frequency components, such that the at least one set of unit energy samples is representative of a unit energy corresponding to the set of frequency components extracted for the object. In an example, the signal processing unit may generate each of the at least one set of unit energy samples by scaling down the amplitude of the frequency components within a corresponding set of frequency components by a factor of square root of total energy of the corresponding set of frequency components. Further, in an example, the signal processing unit may sum square of amplitudes of each frequency component within a set of frequency components to compute the total energy corresponding to the set of frequency components.

In an example of the present subject matter, the signal processing unit may also compute a range compensated energy (RCE) corresponding to the object based on the at least one set of frequency components, such that the RCE is indicative of range normalized energy corresponding to the object.

The RCE may be computed by the signal processing unit by first determining range indicator value corresponding to the peak beat frequency and thereafter computing fourth power value of the range indicator value. The signal processing unit may also multiply the fourth power value of the range indicator value with the total energy of the at least one set of frequency components to obtain the RCE.

Finally, the signal processing unit may generate a feature vector corresponding to the object, based at least on the at least one set of unit energy samples and the RCE, where the feature vector is representative of characteristics of the object. It would be understood that the computation of the at least one set of unit energy samples and the RCE allows normalization of the properties of the received radar signal, such that the at least one set of unit energy samples represent a signal with one-unit energy and the RCE is indicative of energy of the object at one-unit distance. Hence, the feature vector thus generated includes true characteristics of the object, while discarding the properties not related to the object, such as distance of the object from the antennas 106 and object's angle with respect to the antenna 106 of the radar detection system 102.

In an example of the present subject matter, the feature vector may also include features corresponding to other characteristics of the object determined based on one of doppler effect, micro-doppler effect, and velocity. In an example of the present subject matter, the feature vector is utilized to classify the object. In another example, the feature vector is utilized to train the radar detection system for classification of objects based on feature vectors.

Figure 4:
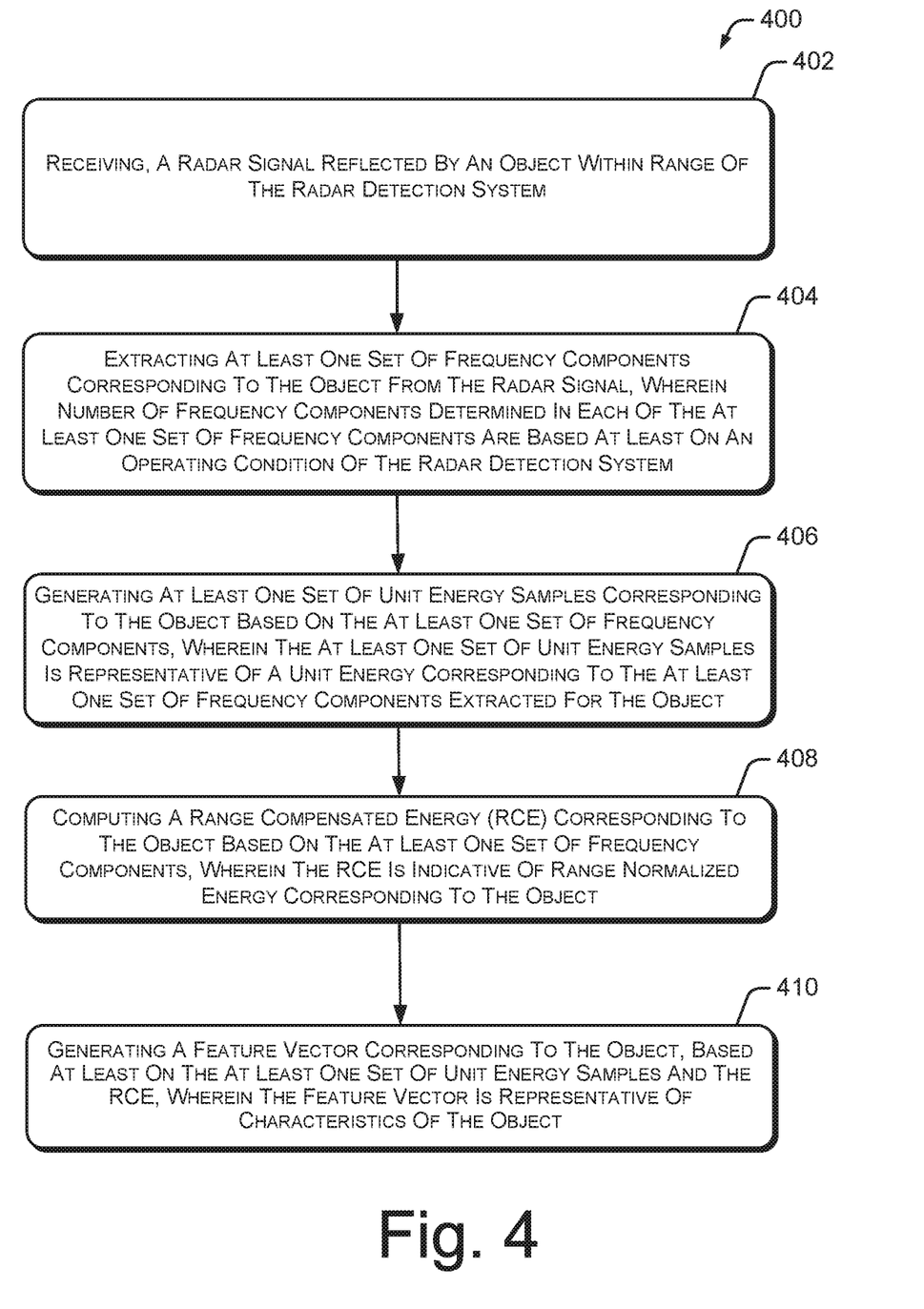
FIG. 4 illustrates a method for classification of objects, by a radar detection system, in accordance with an example implementation of the present subject matter

FIG. 4 illustrates a method 400 for classifying objects by a radar detection system, according to an embodiment of the present subject matter. The order in which the method 400 is described is not intended to be construed as a limitation, and any number of the described method blocks can be combined in any order to implement the method 400, or an alternative method. Additionally, individual blocks may be deleted from the method without departing from the spirit and scope of the subject matter described herein. Furthermore, the methods can be implemented in any suitable hardware, firmware, or combination thereof.

A person skilled in the art will readily recognize that steps of the method can be performed by programmed computers. Herein, some embodiments are also intended to cover program storage devices, for example, digital data storage media, which are machine or computer readable and encode machine-executable or computer-executable programs of instructions, wherein said instructions perform some or all of the steps of the described method. The program storage devices may be, for example, digital memories, magnetic storage media such as a magnetic disks and magnetic tapes, hard drives, or optically readable digital data storage media. The embodiments are also intended to cover both communication network and communication devices configured to perform said steps of the exemplary method.

At block 402, a radar signal reflected by an object within range of the radar detection system is received. The radar signal may in one case may be a FMCW radar signal reflected by the objects depending upon various properties of the surface of the object, like area, paint, reflectivity, polish, etc.

At block 404, at least one set of frequency components is extracted corresponding to the object from the radar signal, where number of frequency components determined in each of the at least one set of frequency components are based at least on configuration, operating condition, and operating environment of the radar detection system.

At block 406, at least one set of unit energy samples is generated corresponding to the object based on the at least one set of frequency components, where the at least one set of unit energy samples is representative of a unit energy corresponding to the at least one set of frequency components extracted for the object.

At block 408, a range compensated energy (RCE) is computed corresponding to the object based on the at least one set of frequency components, wherein the RCE is indicative of range normalized energy corresponding to the object.

At block 410 a feature vector is generated corresponding to the object, based at least on the at least one set of unit energy samples and the RCE, features derived from doppler effect, micro-doppler effect, velocity, elevation measurements, azimuth measurements, range measurements, wherein the feature vector is representative of characteristics of the object.

In an example, the feature vectors are used for training of machine learning or deep learning techniques. The said techniques could be any of supervised type, unsupervised type, semi-supervised type, reinforcement type. Further, machine learning techniques may include Support Vector Machines, Linear Regressions, Logistic Regressions, K-Means, Gradient Boostings, Nearest Neighbors, Naïve Bayes, Decision Trees, Linear Regressions, Random Forests, Neural Networks, Deep Neural Networks, and Convolutional Neural Networks. Training can be done online or offline. Further, feature vectors may also be used for prediction of the object class.

Although implementations of the radar detection system have been described in a language specific to structural features and/or applications, it is to be understood that the present subject matter is not limited to the specific features or applications described. Rather, the specific features and applications are disclosed as exemplary implementations.

We claim:

1. A method of object classification by a radar detection system, the method comprising:
   receiving, by a signal receiving unit, a radar signal reflected by an object within range of the radar detection system;
   extracting at least one set of frequency components corresponding to the object from the radar signal, wherein number of frequency components determined in each of the at least one set of frequency components are based at least on an configuration, operating condition, and operating environment of the radar detection system;
   generating at least one set of unit energy samples corresponding to the object based on the at least one set of frequency components, wherein the at least one set of unit energy samples is representative of a unit energy corresponding to the at least one set of frequency components extracted for the object, and wherein generating each one of the at least one set of unit energy samples comprises scaling down the amplitude of the frequency components within a corresponding set of frequency components by a factor of square root of total energy of the corresponding set of frequency components;
   computing a range compensated energy (RCE) corresponding to the object based on the at least one set of frequency components, wherein the RCE is indicative of range normalized energy corresponding to the object; and generating a feature vector corresponding to the object, based at least on the at least one set of unit energy samples and the RCE, wherein the feature vector is representative of characteristics of the object.

2. The method as claimed in claim 1 further comprising analysing the generated feature vector to determine a class of the object.

3. The method as claimed in claims 1 further comprising utilizing the feature vector for training the radar detection system.

4. The method as claimed in claims 1, wherein the at least one set of frequency components comprises at least one of a set of range frequency components, a set of azimuthal frequency components, and a set of elevation frequency components.

5. The method as claimed in claims 1, wherein the feature vector further comprises features corresponding to characteristics of the object, and wherein the features are determined based on one of doppler effect, and velocity.

6. The method as claimed in claims 1, wherein computing the RCE comprises:
   determining a range indicator value corresponding to the peak beat frequency where peak beat frequency is the one with maximum amplitude amongst all the frequency components corresponding to the object;
   computing fourth power value of the range indicator value; and
   multiplying the fourth power value of the range indicator value with the total energy of the set of frequency components to obtain the RCE.

7. The method as claimed in claims 1, wherein the set of frequency components comprises at least a peak beat frequency corresponding to the object, wherein the peak beat frequency is indicative of range of the object from the signal receiving unit.

8. The method as claimed in claims 7, wherein amplitude and energy of the peak beat frequency is based on size and reflectivity of the object.

9. The method as claimed in claim 7, wherein the peak beat frequency is determined based on comparison of amplitude of frequency components within the radar signal with a predetermined threshold amplitude value.

10. A radar detection system for object classification comprising:
    a signal receiving unit to receive a radar signal reflected by an object within range of the radar detection system; and
    a signal processing unit to:
    extract at least one set of frequency components corresponding to the object from the radar signal, wherein number of frequency components included in each of the at least one set of frequency components are based at least on at least one of configuration, operating condition, and operating environment of the radar detection system;
    generate at least one set of unit energy samples corresponding to the object based on the at least one set of frequency components, wherein the at least one set of unit energy samples is representative of a unit energy corresponding to the set of frequency components extracted for the object, and wherein the signal processing unit generates each of the at least one set of unit energy samples by scaling down the amplitude of the frequency components within a corresponding set of frequency components by a factor of square root of total energy of the corresponding set of frequency components;
    compute a range compensated energy (RCE) corresponding to the object based on the at least one set of frequency components, wherein the RCE is indicative of range normalized energy corresponding to the object; and
    generate a feature vector corresponding to the object, based at least on the at least one set of unit energy samples and the RCE, wherein the feature vector is representative of characteristics of the object.

11. The radar detection system as claimed in claim 10, wherein the signal processing unit is to dynamically determine the number of frequency components to be included in each of the set of frequency components.

12. The radar detection system as claimed in claim 10, wherein the signal processing unit is to further analyze the generated feature vector to determine a class of the object.

13. The radar detection system as claimed in claim 10, wherein the signal processing unit is to further utilize the feature vector for training the radar detection system.

14. The radar detection system as claimed in claim 10, wherein the at least one set of frequency components comprises at least one of a set of range frequency components, a set of azimuthal frequency components, and a set of elevation frequency components.

15. The radar detection system as claimed in claim 10, wherein the signal processing unit determines a peak beat frequency corresponding to the object based on comparison of amplitude of frequency components within the radar signal with a predetermined threshold amplitude value, and wherein the peak beat frequency is indicative of range of the object from the signal receiving unit.

16. The radar detection system as claimed in claim 10, wherein the radar signal is a frequency modulate continuous wave (FMCW) signal.

17. The radar detection system as claimed in claim 10, wherein the signal processing unit sums square of amplitudes of each frequency component within a set of frequency components to compute the total energy corresponding to the set of frequency components.

18. The radar detection system as claimed in claim 17, wherein the signal processing unit to compute the RCE:
    determines range indicator value corresponding to the peak beat frequency;
    computes fourth power value of the range indicator value; and
    multiplies the fourth power value of the range indicator value with the total energy of the at least one set of frequency components to obtain the RCE.

* * * * *